United States Patent [19]

Refoy

[11] 4,205,552
[45] Jun. 3, 1980

[54] ELECTRONIC SPEEDOMETER FOR MARINE CRAFT

[76] Inventor: Brian G. Refoy, 1104 Ridgeway Cir., Richardson, Tex. 75080

[21] Appl. No.: 971,023

[22] Filed: Dec. 19, 1978

[51] Int. Cl.² ............................................. G01C 21/10
[52] U.S. Cl. ..................................................... 73/182
[58] Field of Search ............. 73/182, 183, 212, 205 R, 73/721, 727; 324/99 D, 163; 364/565, 814

[56] References Cited

U.S. PATENT DOCUMENTS

| | | | |
|---|---|---|---|
| 3,820,401 | 6/1974 | Lewis | 73/727 |
| 3,916,365 | 10/1975 | Giachind | 73/727 |

FOREIGN PATENT DOCUMENTS

2270587 12/1975 France ........................................ 73/183

Primary Examiner—Donald O. Woodiel
Attorney, Agent, or Firm—Richards, Harris & Medlock

[57] ABSTRACT

A pitot tube (10) produces pressure when a marine craft moves through water. The pressure produced in the pitot tube (10) is applied to a monolithic pressure transducer (14) that includes a piezoresistive integrated circuit for producing an output voltage proportional to the pressure applied from the pitot tube (10). The output voltage of the pressure transducer (14) is processed through an op amp (28) and a converter (40) to produce a voltage ($E_o$) that is linearly proportional to the speed of the marine craft. This voltage ($E_o$) is applied to a volt meter (62) that is scaled to indicate the speed of the marine craft in distance per unit time.

10 Claims, 1 Drawing Figure

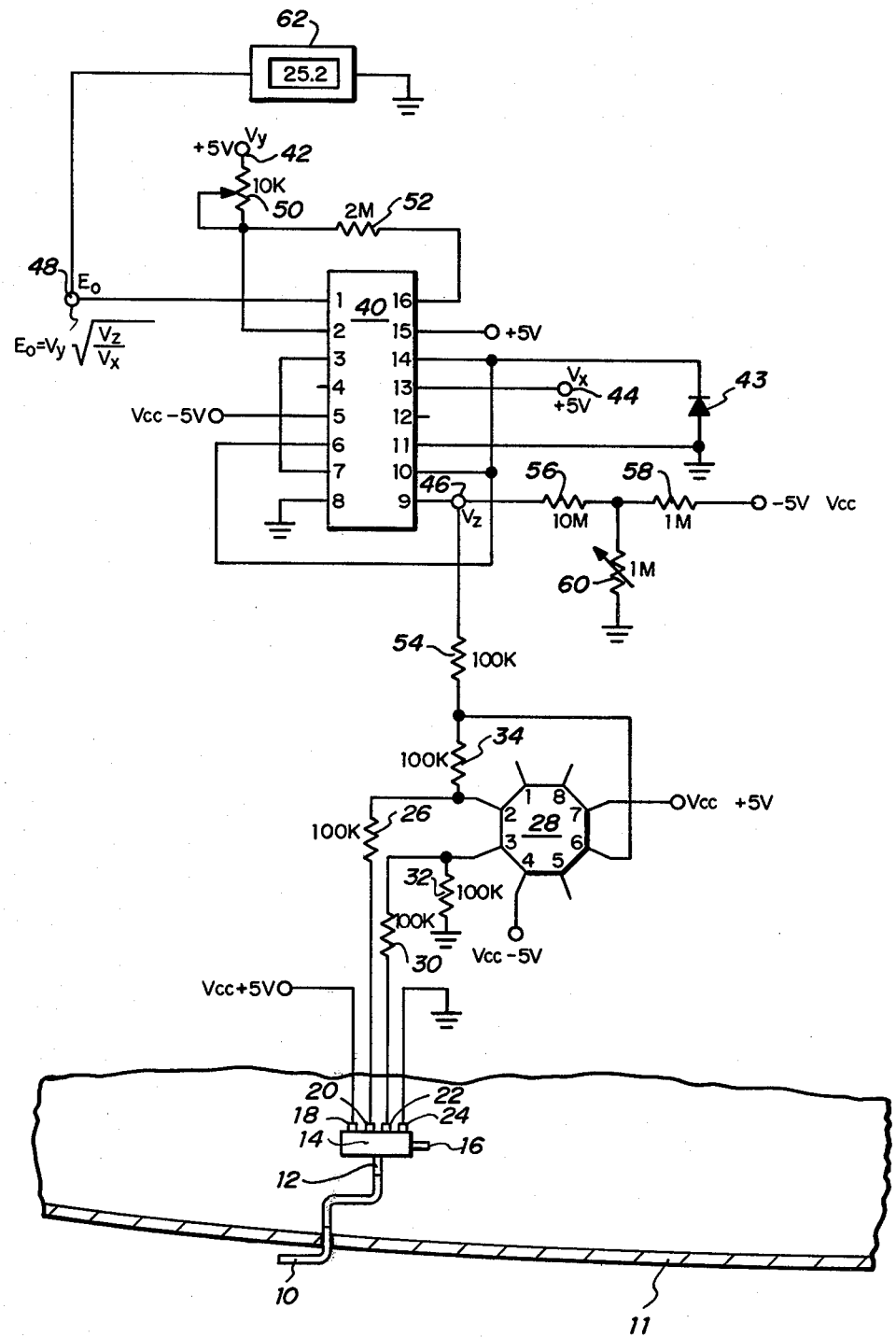

ELECTRONIC SPEEDOMETER FOR MARINE CRAFT

TECHNICAL FIELD

The present invention relates to electronic speedometers for marine craft, and particularly relates to electronic speedometers for marine craft utilizing a pitot tube in combination with an electronic pressure transducer and an electronic converter.

BACKGROUND OF THE INVENTION

Numerous types of speedometers are known in the art for measuring the speed of marine craft relative to the water in which the craft is travelling. One type of conventional marine speedometer utilizes a pitot tube that is disposed in the water to produce pressure within the pitot tube in response to the movement of the craft. Tubing is connected between the pitot tube directly to a mechanical indicator. The pressure created in the pitot tube is used to mechanically drive a needle in the indicator to indicate the speed of the craft. Craft speed is proportional to the square root of the pressure in the pitot tube. Since the pressure is not linearly proportional to the speed of the craft, the mechanical indicator typically includes a nonlinear scale to indicate the speed of the craft relative to water.

This type of marine craft speedometer is often inaccurate. The length of tubing between the pitot tube and the indicator varies with the size of the marine craft and with the location of the indicator in the craft. The tubing tends to dissipate and reduce the pressure response created by the pitot tube with the amount of reduction in pressure being proportional to the length of the tubing. Thus, varying the length of the tubing introduces inaccuracies in speed indication.

As a marine craft travels through waves or choppy water, the pressure on the pitot tube often varies quite rapidly so that the instantaneous pressure on the pitot tube is not proportional to the speed of the marine craft. Under these conditions, the indicator needle of conventional mechanical speedometers bounces, and accurate indications of speed are lost.

A conventional speedometer using a nonlinear scale is also hard to read, and often an operator is confused or mislead by such nonlinear indications of speed. For example, if the needle points to a position one half the distance between 0 and 10 mph, the operator may interpret this reading as 5 mph when in fact the speed is indicated to be approximately 7.07 mph. Many waterways and harbors have a speed limit of 5 mph. An operator of a marine craft with a conventional nonlinear mechanical speedometer as described above may misread such speedometer and unintentionally violate the speed limit.

Another type of conventional marine craft speedometer uses propellers or paddle wheels to measure the speed of the craft relative to the water. However, this type of speedometer is unduly expensive, is generally unreliable and suffers from problems similar to those discussed above.

Thus, a need has arisen for a marine craft speedometer in which the length of the pitot tube plus the tubing connected to the pitot tube is of a predetermined length which is not varied according to the size of the marine craft or the location of the indicator relative to the pitot tube. In this construction, the pressure in the pitot tube will correspond to the speed of the craft in a known manner. Particularly, a need has arisen for an electronic speedometer in which the pressure in a pitot tube is sensed and an electrical voltage is generated in response thereto. This electrical voltage may be transmitted to a volt meter for indicating the speed of the craft. Regardless of the location of the volt meter (the indicator), the length of tubing between the pitot tube and the sensing device is known and is constant. Also, in an electronic speedometer, the voltage output of the sensor device or transducer can be buffered with reactance or integrated over a period of time to produce a smooth indication of the speed of the craft. In this manner, the bouncing needle problem associated with mechanical speedometers is eliminated. Furthermore, a need has arisen for an electronic speedometer producing a voltage that is linearly proportional to the speed of the craft so that a digital indicator (volt meter) or a linearly scaled indicator may be used to indicate speed instead of conventional speed indicators with nonlinear scales.

SUMMARY OF THE INVENTION

In accordance with the present invention, an electronic speedometer is provided for use on a marine craft travelling through water. A pitot tube of a preselected size is mounted on the marine craft for producing pressure in the pitot tube in response to movement of the marine craft through water. A pressure transducer is connected to the pitot tube for producing a transducer output voltage corresponding to the pressure produced in the pitot tube. A converter is responsive to the transducer output voltage for producing a converter output voltage corresponding to the square root of the transducer output voltage, whereby the converter output voltage is linearly proportional to the speed of the marine craft relative to the water. A volt meter is connected to the converter output voltage and calibrated or scaled in distance per unit time for indicating the speed of the marine craft relative to water.

In accordance with an embodiment of the present invention, an electronic speedometer for use on a marine craft travelling through water includes a pitot tube of a preselected size mounted on the marine craft for detecting pressure on said pitot tube resulting from movement of the marine craft through water. A monolithic gauge pressure transducer has an input port in hydraulic communication with the pitot tube for sensing the pressure produced in said pitot tube and has an inlet port exposed to ambient pressure. The hydraulic communication between the pitot tube and the monolithic gauge pressure transducer is established by a predetermined length of flexible tubing connected between the pitot tube and the input port of the pressure transducer. The pressure transducer also includes a piezoresistive integrated circuit for producing a floating output voltage that is linearly proportional to the pressure applied to said input port relative to ambient pressure sensed at said inlet port. An operational amplifier is connected to ground and is connected to receive the floating output voltage. The operational amplifier produces an amplifier output voltage referenced to ground and corresponding in magnitude to the floating output voltage. A converter is connected to ground and connected to receive the amplifier output voltage for producing a converter output voltage corresponding to the square root of the amplifier output voltage, whereby the converter output voltage is linearly proportional to the speed of the marine craft relative to the water. A volt meter is responsive to the converter output voltage and calibrated or scaled in distance per unit of time for indicating the speed of the marine craft relative to water.

BRIEF DESCRIPTION OF THE DRAWING

The present invention may be best understood by those of ordinary skill in the art by reference to the following Detailed Description when considered in conjunction with the Drawing in which a somewhat diagrammatical circuit diagram of an electronic marine craft speedometer is shown embodying the present invention.

DETAILED DESCRIPTION

Referring now to FIG. 1, there is shown a marine craft speedometer embodying the present invention. The speedometer includes a pitot tube 10 that is connected through a marine carft hull 11 to an input port 12 of a pressure transducer 14. The pressure transducer 14 also includes an inlet port 16 that is exposed to ambient pressure. Alternately, the pitot tube 10 may be affixed to the lower rear of a marine craft transom to avoid problems associated with through-hull mountings.

The pitot tube 10 is disposed in the water beneath the marine craft in a position whereby movement of the craft through water will create pressure in the pitot tube 10. The pitot tube 10 as shown in the drawing represents a direct connection between the tube 10 and the input port 12. It will be understood, however, that the pitot tube 10 includes a predetermined length of flexible tubing as a part thereof that is connected to the input port 12.

The pressure transducer 14 is preferably manufactured by National Semiconductor as part no. LX0603GB and includes a piezoresistive integrated circuit for providing an output voltage proportional to pressure applied at the input port 12 relative to the ambient pressure sensed at the inlet port 16. The pressure transducer 14 is suitable for mounting on a printed circuit board, and the input port 12 is adapted for attachment to flexible tubing or the pitot tube 10. The input port 12 can operate in contact with aqueous working fluids, but water must be kept out of the inlet port 16 during operation.

Four electrical terminals, 18, 20, 22 and 24 are shown extending from the pressure transducer 14. A fifth terminal is actually present in the LX0603GB transducer 14 that may be used for temperature compensation purposes. However, temperature compensation is conventional and is not relevant to the present invention. An excitation voltage or power supply at positive five volts is connected to the terminal 18. The terminal 24 is connected to ground.

A floating voltage is produced between terminals 20 and 22 that corresponds to the pressure applied to the input port 12 relative to ambient pressure detected at the inlet port 16. The floating voltage is referred to as "floating" because this voltage is not reference to the ground connected to the terminal 24.

Terminal 20 is connected through a 100 k ohm resistor 26 to pin 2 of an op amp 28. The op amp 28 is preferably a Motorola op amp, part number MLM307. The terminal 22 of the pressure transducer 14 is also connected through a 100 k ohm resistor 30 to pin 3 of the op amp 28, and Pin 3 of op amp 28 is connected through a 100 k ohm resistor 32 to ground.

A power supply is connected to pins 4 and 7 of the op amp 28. A negative five volts (Vcc) is connected to pin 4, and positive five volts (Vcc) is connected to pin 7. Pins 6 and 2 of the op amp 28 are connected together through a 100 k ohm resistor 34. The voltage produced at pin 6 by the op amp 28 is referenced to ground and constitutes the output voltage of the op amp 28. This output voltage of op amp 28 corresponds in magnitude to the floating voltage between terminals 20 and 22 of the pressure transducer 14.

The op amp 28 may be used to increase or decrease the magnitude of the floating voltage between the terminals 20 and 22 to a desired magnitude. Also, the op amp 28 provides an output voltage on pin 6 that is referenced to ground and is compatible with a general purpose converter 40, hereinafter described. The floating voltage produced by the pressure transducer 14 is incompatible with the general purpose converter 40.

The pin 6 of the op amp 28 is connected to pin 9 of the general purpose converter 40. In the preferred embodiment, the converter 40 is a National Semiconductor, part number LH0094, multi-function converter used as a precision square rooter. A power supply is connected to the converter 40 on pins 15 and 5. A positive five volts (Vcc) is connected to pin 15, and a negative five volts (Vcc) is applied to pin 5 of the converter 40. A ground is connected to pin 8 of converter 40.

To operate the converter 40 as a precise square rooter, pins 3 and 7 are connected directly together. Also, pins 6 and 14 of the converter 40 are connected directly together and each are connected through a diode 43 to ground. The ground is also connected directly to pin 11 of the converter 40.

The converter 40 includes input terminals 42, 44 and 46. Input voltages applied to these terminals produce an output voltage on the output terminals 48. $V_y$, positive 5 volts, is applied to terminal 42, and $V_x$, positive 5 volts, is applied to terminal 44. Terminal 42 is connected to a variable 10 k ohm potentiometer 50 whose output is connected directly to pin 2 of the converter 40 and is connected through a 2 M ohm resistor 52 to pin 16 of the converter 40. Terminal 44 is connected directly to pin 13 of the converter 40.

The op amp 28 produces an output voltage which is applied through a 100 k ohm resistor 54 to the terminal 46. The terminal 46 is connected through a 10 M ohm resistor 56 in series with a 1 M ohm resistor 58 to a negative five volt power source (Vcc). A 1 M ohm variable resistor 60 is connected between ground and the junction between resistor 56 and resistor 58.

In this configuration, the output on terminal 48, $V_o$, is equal to $V_y(V_z/V_x)^{0.5}$. The variable potentiometer 50 is used to fine tune or adjust the converter 40 so that the output produced at terminal 48 accurately corresponds to the desired equation of $V_y(V_z/V_x)^{0.5}$. $E_o$ at terminal 48 is connected to the input of a volt meter 62. The volt meter is scaled in distance per unit time, such as miles per hour, to indicate the speed of a marine craft moving through water.

In operation, the pitot tube 10 senses water pressure produced by the movement of the marine craft through water. The pressure developed on the pitot tube 10 is applied to the input port 12 of the transducer 14 that produces an output voltage on terminals 20 and 22 proportional to the pressure sensed by the pitot tube 10. Terminals 20 and 22 are connected to the op amp 28 which produces an amplifier output voltage that is referenced to ground and is also proportional in magnitude to the pressure sensed by the pitot tube 10.

The amplifier output voltage of the op amp 28 is applied as $V_z$ to terminal 46 of the converter 40. $E_o$ produced at terminal 48 is proportional to the square root of $V_z$. Specifically, $E_o$ is proportional to $V_z$ divided by a constant ($V_x$) with the square root of the dividend taken and multiplied by another constant ($V_y$).

The pressure produced in the pitot tube 10 by the motion of the marine craft through water is linearly proportional to the speed of the marine craft squared. Thus, the voltage produced at terminals 20 and 22, and the voltage produced at pin 6 of the op amp 28 ($V_z$) are proportional to the speed of the craft squared. The converter 40 produces an output voltage proportional to the square root of $V_z$ on terminal 46 so that $E_o$ on terminal 48 is linearly proportional to the speed of the marine craft. Thus, when $E_o$ on terminal 48 is applied to the volt meter 62, the readout in voltage is linearly proportional to the speed of the marine craft. By appropriate amplification of $E_o$ or by appropriate scaling of the volt meter 62, the readout on the volt meter may correspond precisely to the speed of the craft in distance per unit time, such as miles per hour. Although a digital volt meter 62 is shown, it will be understood that any appropriately scaled volt meter could be suitable for use in the present invention.

Although a particular embodiment has been described in the foregoing Detailed Description, it will be understood that the present invention is capable of numerous rearrangements, modifications and substitutions of parts without departing from the spirit of the invention.

I claim:

1. An electronic speedometer for use on a marine craft travelling through water comprising:
    a pitot tube of a preselected size mounted on the marine craft for producing pressure in said pitot tube resulting from movement of the marine craft through water, the pressure in said pitot tube being proportional to the square of the speed of the marine craft relative to water;
    a monolithic gauge pressure transducer having an input port in said hydraulic communication with the pitot tube for sensing the pressure produced in said pitot tube and having an inlet port exposed to ambient pressure;
    said pressure transducer including a piezoresistive integrated circuit for producing a floating output voltage linearly proportional to the pressure applied to said input port relative to ambient pressure sensed at said inlet port;
    an operational amplifier connected to ground and being responsive to said floating output voltage for producing an amplifier output voltage referenced to ground and corresponding in magnitude to the floating voltage;
    a converter connected to ground and connected to receive the amplifier output voltage for producing a converter output voltage corresponding to the square root of the amplifier output voltage, said floating output voltage produced by said piezoresistive integrated circuit being incompatible with said converter, the converter output voltage being linearly proportional to the speed of the marine craft relative to water; and
    a volt meter responsive to the converter output voltage and scaled in distance per unit of time for indicating the speed of the marine craft relative to water.

2. The electronic speedometer of claim 1 further comprising an adjustable potentiometer connected to the converter for adjusting the converter output voltage to correspond to the speed of the marine craft relative to water.

3. The electronic speedometer of claim 1 wherein said pitot tube includes a predetermined length of tubing connected to establish hydraulic communication with said input port of said pressure transducer.

4. The electronic speedometer of claim 4 wherein said volt meter is directly connected to said converter.

5. An electronic speedometer for a marine craft travelling through water, comprising:
    a converter responsive to input signal voltage for producing a converter output voltage corresponding to the square root of the input voltage;
    a pitot tube of a preselected size mounted on the marine craft for producing pressure in said pitot tube in response to movement of the marine craft through water, said pressure being proportional to the square of the speed of the marine craft relative to water;
    a pressure transducer connected to said pitot tube for producing an output voltage corresponding to the pressure produced in said pitot tube, which output voltage is incompatible with said converter;
    output means interposed between said pressure transducer and said converter and responsive to the output voltage of said pressure transducer for producing an output voltage corresponding to the pressure produced in said pitot tube and which is compatible with an input to said converter to supply said input signal voltage thereto, the converter output voltage being linearly proportional to the speed of the marine craft relative to the water.

6. The electronic speedometer of claim 5 wherein the output voltage of said pressure transducer is a floating voltage and the output voltage of said output means is referenced to ground, and wherein said converter is connected to ground.

7. The electronic speedometer of claim 6 wherein said output means comprises an operational amplifier connected to ground.

8. The electronic speedometer of claim 5 further comprising a volt meter directly connected to said converter and responsive to the converter output voltage and scaled in distance per unit of time for indicating the speed of the marine craft relative to water.

9. The electronic speedometer of claim 8 further comprising an adjustable potentiometer connected to the converter for adjusting the converter output voltage to correspond to the speed of the marine craft relative to water.

10. The electronic speedometer of claim 9 wherein said converter has a first input for receiving compatible input voltage designated $V_z$ from said output means, a second input for receiving an input power supply voltage designed $V_x$, and a third input for receiving another input power supply voltage designed $V_y$, said converter producing an output voltage which is the product of $V_y$ and the square root of the quotient of $V_z$ and $V_x$, said adjustable potentiometer being connected to vary the value of $V_y$.

* * * * *